United States Patent
Ahmed et al.

(10) Patent No.: US 9,537,840 B2
(45) Date of Patent: Jan. 3, 2017

(54) INFORMATION HANDLING SYSTEM SECURE RF WIRELESS COMMUNICATION MANAGEMENT WITH OUT-OF-BAND ENCRYPTION INFORMATION HANDSHAKE

(71) Applicant: Dell Products L.P., Round Rock, TX (US)

(72) Inventors: Syed S. Ahmed, Round Rock, TX (US); I-Yu Chen, Taipei (TW); Minhazul Islam, Durham, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 44 days.

(21) Appl. No.: 14/580,926

(22) Filed: Dec. 23, 2014

(65) Prior Publication Data

US 2016/0182469 A1    Jun. 23, 2016

(51) Int. Cl.
G06F 19/00 (2011.01)
H04L 29/06 (2006.01)
H04W 12/04 (2009.01)

(52) U.S. Cl.
CPC ........... *H04L 63/0492* (2013.01); *H04L 63/18* (2013.01); *H04W 12/04* (2013.01)

(58) Field of Classification Search
CPC .......................... G06Q 10/087; G06Q 10/0875
USPC ......................... 235/379, 385, 376
See application file for complete search history.

(56) References Cited

U.S. PATENT DOCUMENTS

| | | | |
|---|---|---|---|
| 2013/0282564 A1* | 10/2013 | Sibbald | H04M 1/72525 705/39 |
| 2014/0071818 A1* | 3/2014 | Wang | H04W 28/06 370/230 |
| 2014/0081970 A1* | 3/2014 | Sueyoshi | G06F 21/6254 707/736 |

OTHER PUBLICATIONS

Balwant Godara et al., The First Active Tunable Wideband Impedance Matching Circuit, (Institut Supérieur d'Electronique de Paris (ISEP)) (Laboratoire IMS—ENSEIRB), Applied Electronics 2008.

* cited by examiner

*Primary Examiner* — Daniel St Cyr
(74) *Attorney, Agent, or Firm* — Terrile, Cannatti, Chambers & Holland, LLP; Robert W. Holland (57) ABSTRACT

A server information handling system baseboard management controller (BMC) includes an NFC transceiver that communicates NFC signals through an NFC antenna structure. The BMC selectively configures the NFC antenna structure to isolate portions of conductive material for use as an antenna in non-NFC communications, such as wireless local area network communications (WLAN) at 2.4 or 5 GHz or wireless personal area network (WPAN) communications at 2.4 or 60 GHz. In one embodiment, WLAN and WPAN communications are encrypted with a key provided through NFC or other types of wireless communication, such as visible, infrared or ultraviolet light signals.

15 Claims, 4 Drawing Sheets

INFORMATION HANDLING SYSTEM SECURE RF WIRELESS COMMUNICATION MANAGEMENT WITH OUT-OF-BAND ENCRYPTION INFORMATION HANDSHAKE

CROSS REFERENCE TO RELATED APPLICATION

U.S. patent application Ser. No. 14/580,912, entitled "Information Handling System Multi-Purpose NFC Antenna" by inventors Syed S. Ahmed, I-Yu Chen, and Minhazul Islam, filed Dec. 23, 2014, describes exemplary methods and systems and is incorporated by reference in its entirety.

BACKGROUND OF THE INVENTION

1. Field of the Invention

The present invention relates in general to the field of information handling system wireless communication, and more particularly to an information handling system multi-purpose NFC antenna.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are often situated in rows of racks disposed in data centers. The data centers provide infrastructure resources that keep the server information handling systems running in a reliable manner. For example, a data center typically includes cooling, power and network resources that support densely loaded racks of server information handling systems. In addition, data centers typically have a staff of information technology (IT) administrators who maintain physical information handling system resources, such as by repairing or replacing information handling systems or their components as needed. IT administrators have physical access to server information handling systems and also manage some processing aspects of server information handling systems through a network-interfaced baseboard management controller (BMC) or similar management device. For example, a BMC allows IT administrators to remote start and shut down a server information handling system, to update firmware of components, to patch software, and to perform other management and maintenance functions.

Although IT administrators have physical access to server information handling systems and perform management functions with access to BMCs, IT administrators often do not have access to applications running on server information handling systems or data stored by the applications. Generally, applications and data supported by server information handling systems are managed with secured access separate from that used by IT administrators for management functions. In some data centers, server information handling systems are allocated for use by different entities who manage the applications and data separately from the IT administrators. Indeed, by running virtual machines that allocate resources to processing functions in a dynamic manner, the same physical processing resources can have sensitive data from several different entities securely accessible by only IT administrators of each entity. In essence, the modern data center is bifurcated between management functions that keep physical resources running and user functions that use the physical resources to perform functions in support of end users, such as enterprises.

Generally, server information handling systems have management functions performed with communications sent by wired communication interfaces, such as Ethernet. Some server information handling systems and BMCs include wireless communication, such as a wireless local area network (WLAN) or wireless personal area network (WPAN, i.e., Bluetooth) so IT administrators can communicate locally with the server information handling system using wireless signals. In many instances, data centers and enterprises prohibit the use of wireless communication to and from server information handling systems for security reasons. For instance, wireless communication signals may be sniffed by malicious attackers and used to aid attacks on physical and/or virtual server information handling system resources. Wireless communication is also not a practical solution in many data center environments where densely packed racks of server information handling systems would have difficulty coordinating wireless channels and protocols. Further, implementing a WLAN or WPAN chip and antenna in the restricted physical space available at a BMC presents a design challenge for server information handling system manufacturers.

One wireless communication alternative to WLAN and WPAN communications is near field communications (NFC). NFC operates at a relatively low frequency (13.56 MHz versus 2.4 and 5 GHz for WLAN and WPAN) over a relatively short range, generally measured in centimeters instead of meters. NFC transmits information with opposing inductors that detect a magnetic field related to current flow. A typical NFC antenna is a loop of conductive material that generates a magnetic field to induce a current in an opposing loop of conductive material. The current is measured at the opposing loop to determine information signals. NFC is an acceptable wireless communication medium for most server data centers because of its limited range, however, NFC often has limited usefulness due to its relatively low bandwidth. A typical NFC device ends one tag at a time with a typical tag size measure in bytes. Sending larger amounts of data through NFC generally requires the end user to send multiple tags while holding the sending device in close proximity to the receiving device. These limitations have impacted the adoption of NFC in data centers so that IT administrators tend to rely instead on communications through hardwired interfaces.

SUMMARY OF THE INVENTION

Therefore a need has arisen for a system and method which configures an NFC antenna to support wireless communication with WLAN and WPAN frequencies and protocols.

A further need exists for a system and method which configures wireless communications associated with a server information handling system to have enhanced security.

In accordance with the present invention, a system and method are provided which substantially reduce the disadvantages and problems associated with previous methods and systems to support wireless communications associated with server information handling systems. An NFC coil antenna selectively has portions of conductive material isolated that provide an antenna for non-NFC communications, such as communications at 2.4, 5 and 60 GHz. A management controller or other microcontroller, such as a baseboard management controller (BMC) of a server information handling system selectively configures the NFC antenna for NFC and non-NFC communications based upon predetermined conditions, such as the availability of a shared private encryption key communicated by NFC before permitting configuration of the NFC antenna to accept non-NFC communications. For example, an NFC communication provides user credentials to the BMC and, if the user is authenticated, then the BMC will provide the encryption keys, SSID and SSID password back to the user by NFC so that the user's device connects with the key, SSID and SSID password through a wireless interface, such as WLAN.

More specifically, a server information handling system processes information with instructions executed by a processor and stored in memory. A BMC manages the server information handling system, such as by providing remote power up and power down. The BMC or other microcontroller interfaces with an NFC transceiver and a wireless network interface card (WNIC) that supports WLAN and WPAN communications. Both the NFC transceiver and the WNIC interface through a multiplexor with the NFC antenna coil. The BMC commands the multiplexor to interface the NFC transceiver with the NFC coil antenna when NFC communications are desired and to interface with the WNIC when non-NFC communications are desired, such as WLAN or WPAN communications. When the WNIC is interfaced with the NFC communication coil, a switch disposed in the NFC communication coil opens to isolated a portion of the NFC communication coil's conductive material to provide an RF antenna. A matching circuit associated with each of the NFC and WNIC transceivers matches the conductive material to ensure proper antenna resonance. In one embodiment, the BMC defaults to the use of the NFC antenna and prohibits configuration of the NFC antenna coil for non-NFC communications unless authentication and exchange of an encryption key is shared with an opposing device, such as with an NFC communication. For example, authentication may be required by NFC as set forth in U.S. patent application Ser. No. 14/038,128, entitled "Secure Near Field Communication Server Information Handling System Support" incorporated herein as if fully set forth. In another embodiment, the key is sent by other wireless communications including non-RF communications, such as visible light illumination, infrared illumination or ultraviolet illumination. In one alternative embodiment, for added security reasons, key exchanges occur over the non-RF medium while devices are communicating over the RF medium so that, after an initial hand shake the encryption protocol and keys dynamically change during the established RF link with the sideband non-RF medium, such as IR.

The present invention provides a number of important technical advantages. One example of an important technical advantage is that an NFC antenna selectively reconfigures to support communications with frequencies and protocols that support WLAN and/or WPAN communications. Sharing the NFC antenna structure to support WLAN and/or WPAN provides a more efficient use of space in the server information handling system, such as the BMC portion, so that multiple wireless communication protocols are available within a given footprint. Switching communications between NFC and other protocols allows transfer of unique private keys by the shorter range and smaller bandwidth of NFC so that wireless signals having greater potential range have a more secure encryption. Other types of transfer media to establish a private key for use with wireless communication may also be used separately or in combination with NFC communications, such as infrared of ultraviolet light flashes, a standalone QR code or a QR code depicted at any display, or a unique set of illuminated diagnostic LEDs captured by a camera or manually input by an end user. In one example embodiment, the NFC antenna is segmented to provide directional control of WLAN and WPAN signals towards the location at which an NFC device is located so that reduced transmission power may be used, thereby decreasing the risk of malicious interception without impacting reception by the intended device, such as a smartphone.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A server information handling system baseboard management controller selectively configures an antenna structure to communicate management information with a portable information handling system by NFC or by secure WLAN and/or WPAN communications. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
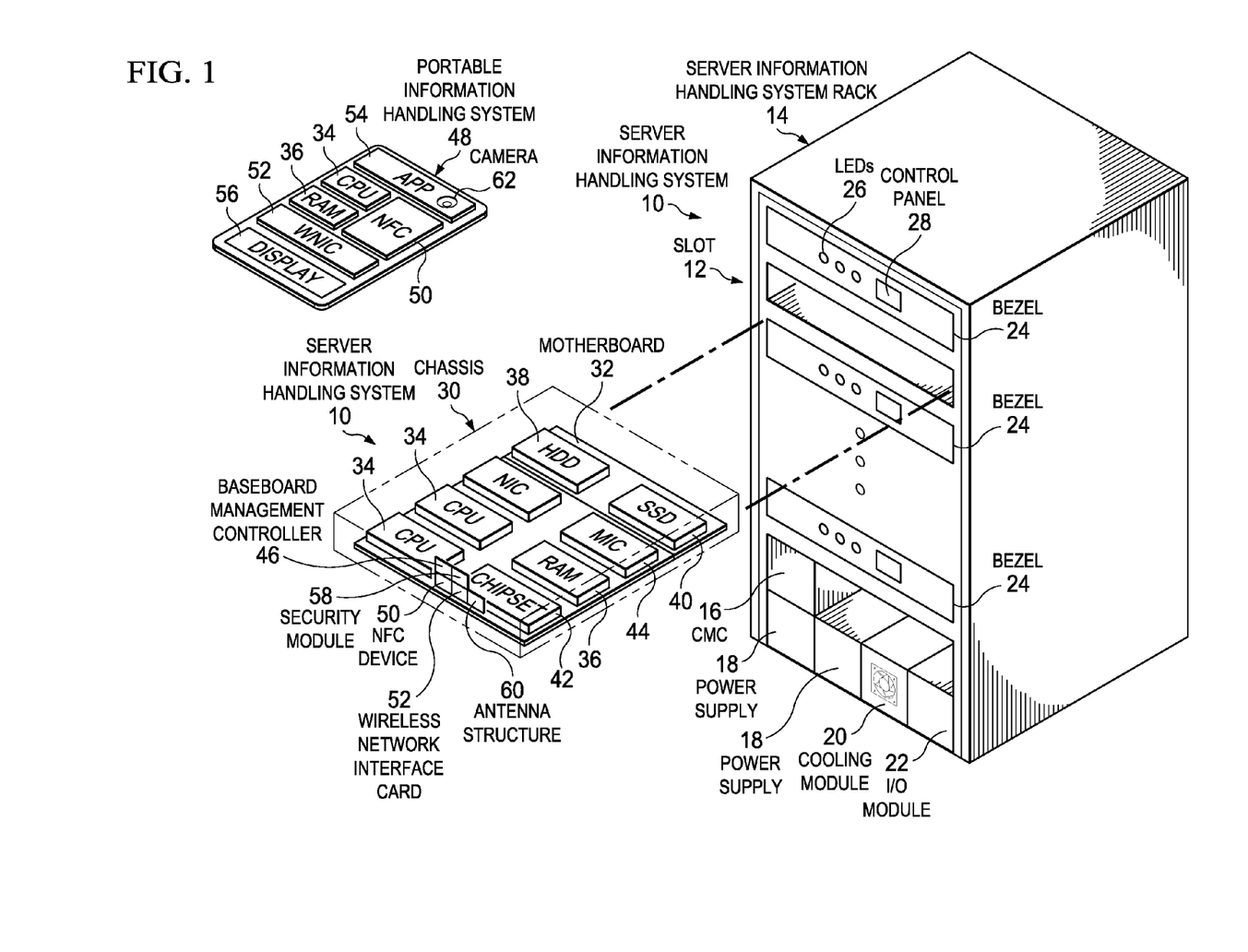
FIG. 1 depicts a server information handling system having secure wireless communication supported by a configurable antenna structure.

Referring now to FIG. 1, a server information handling system 10 is depicted having secure wireless communication supported by a configurable antenna structure. In the example embodiment of FIG. 1, plural server information handling systems 10 are disposed slots 12 of a rack 14. Each server information handling system 10 interfaces with a chassis management controller (CMC) 16 of rack 14, which manages infrastructure to maintain operations of the server information handling systems 10, such as by providing power from power supplies 18, thermal control with a cooling module 20, and communications through an Input/Output module 22, such as Ethernet communications supported by a switch interfaced with an external network. Each server information handling system 10 has a front bezel 24 that supports basic input and output devices, such as diagnostic LEDs 26 that display maintenance and other codes and a control panel 28 that presents status information and accepts manual inputs. Each server information handling system 10 assembles on a chassis 30 that supports processing components disposed in a slot 12. For example, a motherboard 32 interfaces one or more central processing units (CPUs) 34 with random access memory (RAM) 36 to execute instructions that process information, such as in response to client information handling systems interfaced through a network. A hard disk drive 38 and solid state drive 40 provide persistent storage of information accessible by CPUs 34. A chipset 42 includes processors and firmware stored in flash memory that coordinates the interaction between processing components of server information handling system 10. Network interface cards 44 provide an interface to communicate with networks, such as a wired-Ethernet local area network available through I/O module 22.

Server information handling systems 10 are managed by a baseboard management controller (BMC) 46, which provides an out-of-band network interface to support remote management, such as remote power-up, remote power down, and remote software and firmware updates. Administrators also interface directly with BMC 46 at bezel 24 to perform management functions, such as initiating upgrades and configuring network settings. Administrators may input information manually through control panel 28, visually observe diagnostic codes displayed by LEDs 26, or may interface using a portable information handling system 48 that communicates through a wireless communication medium compatible with BMC 46. In the example embodiment, BMC 46 supports wireless communication through a Near Field Communication (NFC) module 50 or through a wireless network interface card (WNIC) 52 that support wireless local area network (WLAN) protocols, such as 802.11 b, g, n or ac, and/or wireless personal area network (WPAN) protocols, such as Bluetooth at 2.4 GHz or 802.11ad at 60 GHz. To interact wirelessly with BMC 46, portable information handling system 48, such as a smartphone or tablet, executes an application 54 with a CPU 34 and RAM 36 that establishes communication using an integrated NFC device 50 or WNIC 52 and presents an interface for the communication at a display 56.

Although WNIC 52 can support WLAN and even WPAN communications at distance of 100 yards or more, administrators in a typical data center typically prefer any wireless communications to have a limited range. Generally, administrators will perform remote interactions through wired network resources, such as an Ethernet and/or I2C management network interface, and will use wireless communications directly with a BMC when in visual contact with the target server information handling system 10. Another reason for restricting the range of wireless communications with a BMC 46 is to restrict the range at which the transmissions may be intercepted and at which an unauthorized individual might attempt to contact the BMC. In order to maintain secure wireless communications between portable information handling system 48 and BMC 46, a security module 58 associated with BMC 46, such as a firmware module executing on BMC 46, ensures that communications are encrypted in a secure manner, such as with a randomly generated private key for one time use. In one embodiment, security module 58 limits unencrypted wireless communications to a short range by selectively configuring an antenna structure 60 to communicate by either NFC or higher frequency radio signals used for WLAN and WPAN communications.

Security module 58 maintains secure communications by exchanging an encryption key with application 54 by a first wireless communication medium and then applying the encryption key to encrypt communications in a second wireless communication medium. The first wireless communication medium has a restricted range that makes unlikely a detection of the key by an unauthorized individual. For example, the key is presented with optical medium and captured by a camera 62 of portable information handling system 48. The optical medium may include sequential flashing of LEDs 26, flashing of LEDs 26 with color variations, flashing of infrared or ultraviolet lights integrated in server information handling system 10, or flashing of infrared or ultraviolet lights from another source in the data center. As another example of an optical medium, the key is presented at control panel 28 as text or a bar code, such as a QR code, that camera 62 captures and application 54 reads to determine the encryption key. Another wireless medium is an NFC communication to send the encryption key through antenna structure 60. NFC has a restricted range generally measured in centimeters that is unlikely to be intercepted by an unauthorized individual. Once security module 58 has exchanged an encryption key with application 54, security module 58 re-configures antenna structure 60 to support communication by WNIC 52, such as in WLAN or WPAN frequency bands and protocols. Requiring authentication before allowing WLAN or WPAN antenna structures to configure reduces the risk of unauthorized WLAN or WPAN communications; however, in some embodiments the antenna structure may re-configure without NFC authentication performed as a prerequisite. WLAN and WPAN protocols provide greater range and bandwidth to support more rapid communications of management information. Encryption of the WLAN and WPAN communications reduces the risk of unauthorized access to management information communicated with BMC 46 while providing increased data transfer rates that allow administrators to more rapidly perform data transfers.

Figure 2:
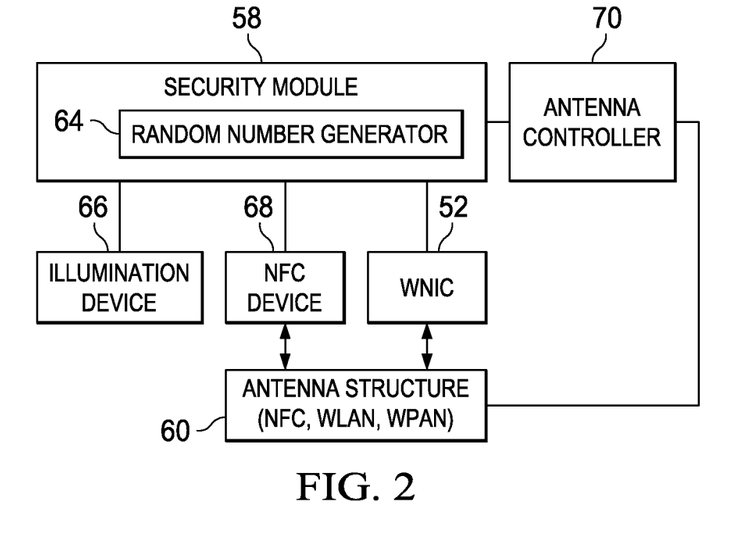
FIG. 2 depicts a block diagram of a system for secure wireless communication supported by a configurable antenna structure.

Referring now to FIG. 2, a block diagram depicts a system for secure wireless communication supported by a configurable antenna structure 60. In the example embodiment, security module 58 includes a random number generator 64 that generates a random number key for each BMC 46 WLAN or WPAN communication. Security module 58 sends the key to a first wireless communication medium device to communicate the key to portable information handling system 48 application 54. In the example embodiment, security module 58 sends the key in response to an NFC communication request through NFC device 58 by including the key in an NFC communication or, alternatively, by sending the key through an illumination device 66, such as visual light signals of diagnostic LEDs, text at a display panel, a QR code at a display panel, an infrared illumination or an ultraviolet illumination. For example, an administrator enters login information by NFC to BMC 46 in order to initiate presentation of the key by illumination device 66. In alternative embodiments, the encryption key is requested and sent by NFC communication or illuminated at desired times by illumination device 66 without a request. In such an embodiment, the encryption key is to secure information sent by wireless signals without regard to authorization of the administrator for access to BMC 46 functions.

Once the administrator's application has the security key, security module 58 authorizes an antenna controller 70 to configure antenna structure 60 to communicate by WLAN or WPAN frequency bands and protocols. Antenna controller 70 interacts with antenna structure 60 to re-configure conductive material used for NFC signal transfer into a configuration that supports conventional RF signals in WLAN and WPAN frequency bands. By restricting antenna structure 60 in an NFC configuration until an encryption key is established, security module 58 effectively prevents communication with longer range wireless RF signals so that BMC 46 is less susceptible to unauthorized eavesdropping or hack attacks.

Figure 3:
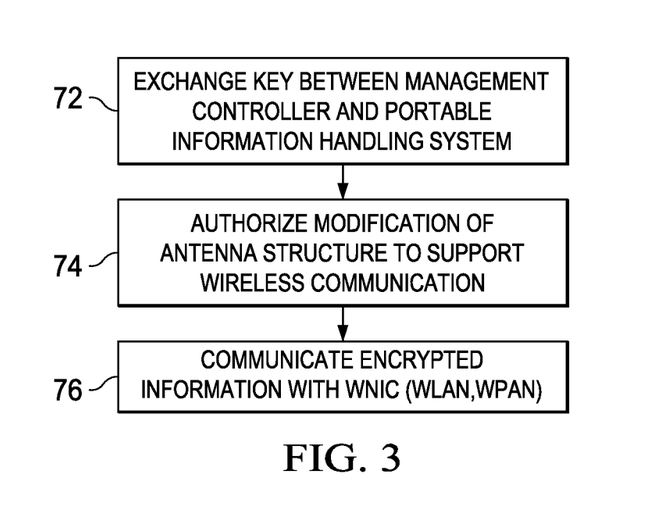
FIG. 3 depicts a flow diagram of a process for establishing a secure wireless communication with a configurable antenna structure.

Referring now to FIG. 3, a flow diagram depicts a process for establishing a secure wireless communication with a configurable antenna structure. The process starts at step 72 with an exchange of an encryption key between a management controller and portable information handling system, such as with a visible light signal or NFC communication. At step 74, authorization is provided for modification of the antenna structure to support wireless communication using the encryption key, such as WLAN or WPAN communications that provide improved bandwidth for more rapid communication of management information. In one embodiment, the antenna structure defaults to an NFC configuration and re-configures to a WLAN or WPAN configuration for a limited time period following successful communication of the encryption key so that a randomly-generated key is required to continue communications after the time period. By defaulting to an NFC configuration, antenna structure essentially prevents unauthorized attacks in WLAN and WPAN frequency bands. At step 76, management information is communicated between the WNICs of BMC 46 and portable information handling system 48 in an encrypted format using the encryption key.

Figure 4:
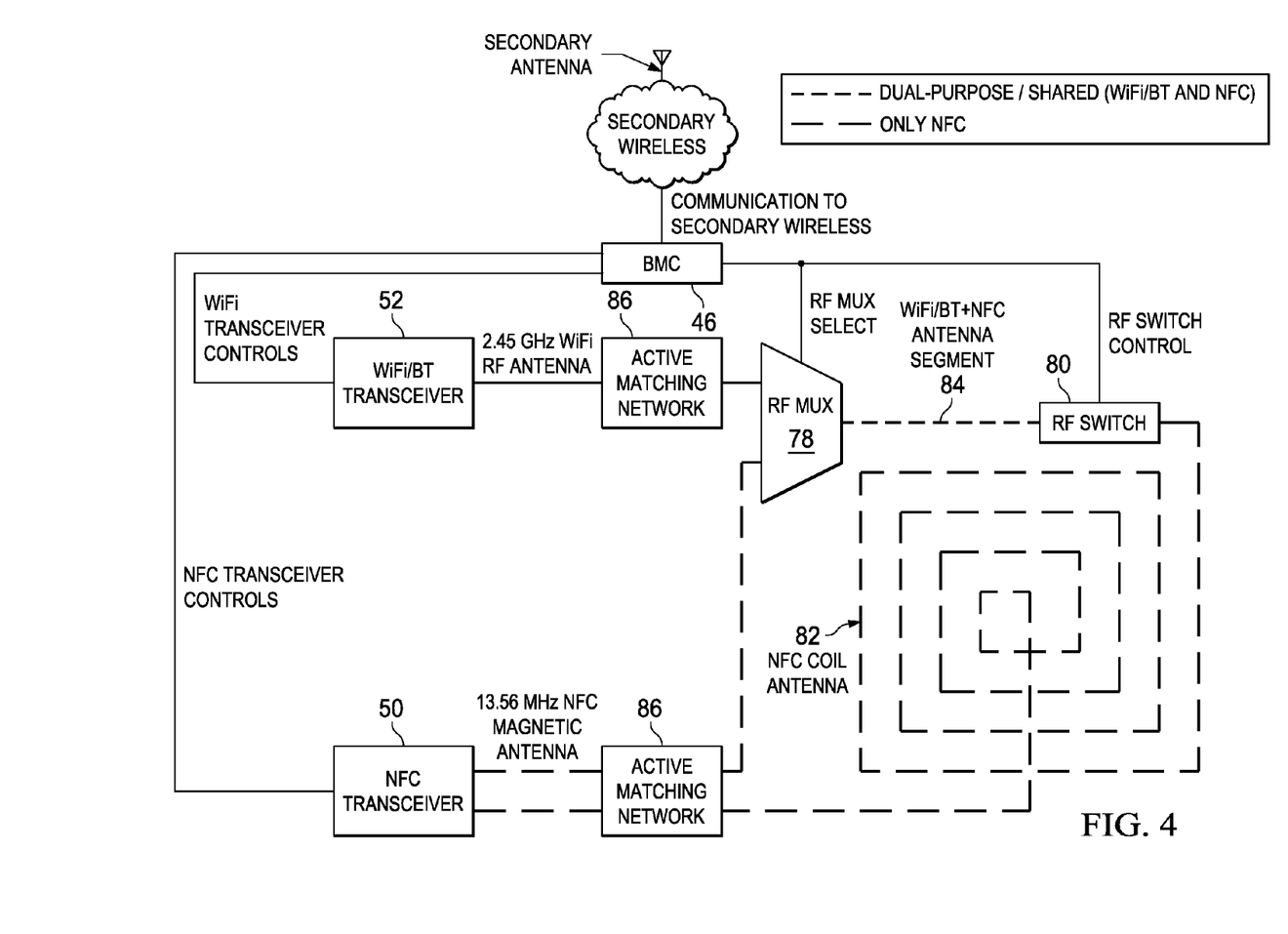
FIG. 4 depicts a circuit block diagram of a wireless communication system to support secure wireless communication with a configurable antenna structure.

Referring now to FIG. 4, a circuit block diagram depicts a wireless communication system to support secure wireless communication with a configurable antenna structure. BMC 46 manages communication of management information by wireless signals by selectively configuring an NFC coil antenna 82 to provide an isolated segment 84 tuned for communication in a WLAN WiFi or WPAN BlueTooth frequency band, such as 2.4 GHz. BMC 46 defaults NFC coil antenna 82 in an NFC configuration that provides a current path from NFC transceiver 50 through an active matching network 86 and RF MUX 78 then out through active matching network 86 to NFC transceiver 50. NFC transceiver 50 sends NFC communication signals at 13.56 MHz by altering current through the conductive NFC coil antenna to generate magnetic fields read by a nearby NFC antenna through near field effects. In one embodiment, BMC 46 sends a randomly-generated encryption key by an NFC signal through NFC transceiver 50 in response to authorized login information, such as a valid username and password, provided from a portable information handling system through an NFC communication.

Once BMC 46 has provided the encryption key through an NFC communication, BMC 46 commands RF MUX 78 to accept inputs from WiFi/Bluetooth transceiver 52 instead of from NFC transceiver 50 so that BMC 46 can exchange management information with WLAN and/or WPAN communications that provide increased bandwidth relative to NFC communications. BMC 46 reconfigures NFC coil antenna 82 to send WLAN and/or WPAN wireless signals by opening RF switch 80 to terminate current flow. In one embodiment, plural RF switches may be included to provide plural antenna lengths or configurations. Once WLAN and/or WPAN communications are complete, such as after a password validity timeout, BMC 46 defaults back to an NFC communication configuration by commanding RF Mux 78 to accept inputs from NFC transceiver 50 instead of WiFi/BlueTooth transceiver 52 and by closing RF switch 80 to permit current to flow through NFC coil antenna 82. Matching networks 86 associated with each transceiver 50 and 52 match the impedance of the configured antenna to the transmitting frequency so that the antenna resonates efficiently. In one embodiment, active matching networks 86 are used to adapt to changes in the antenna impedance over time. Active matching adjusts for changes in the electrical characteristics of switches and multiplexor devices over time that might otherwise impact signal propagation. Active matching uses a secondary antenna as depicted in FIG. 4 to connect to the primary antenna, the analyzes parameters like signal strength, signal power, signal to noise ratio to change the active matching controller to improve signal quality, such as by more accurately matching the impedance. In one embodiment, a sweep of such parameters helps to adjust for environmental noise.

Figure 5:
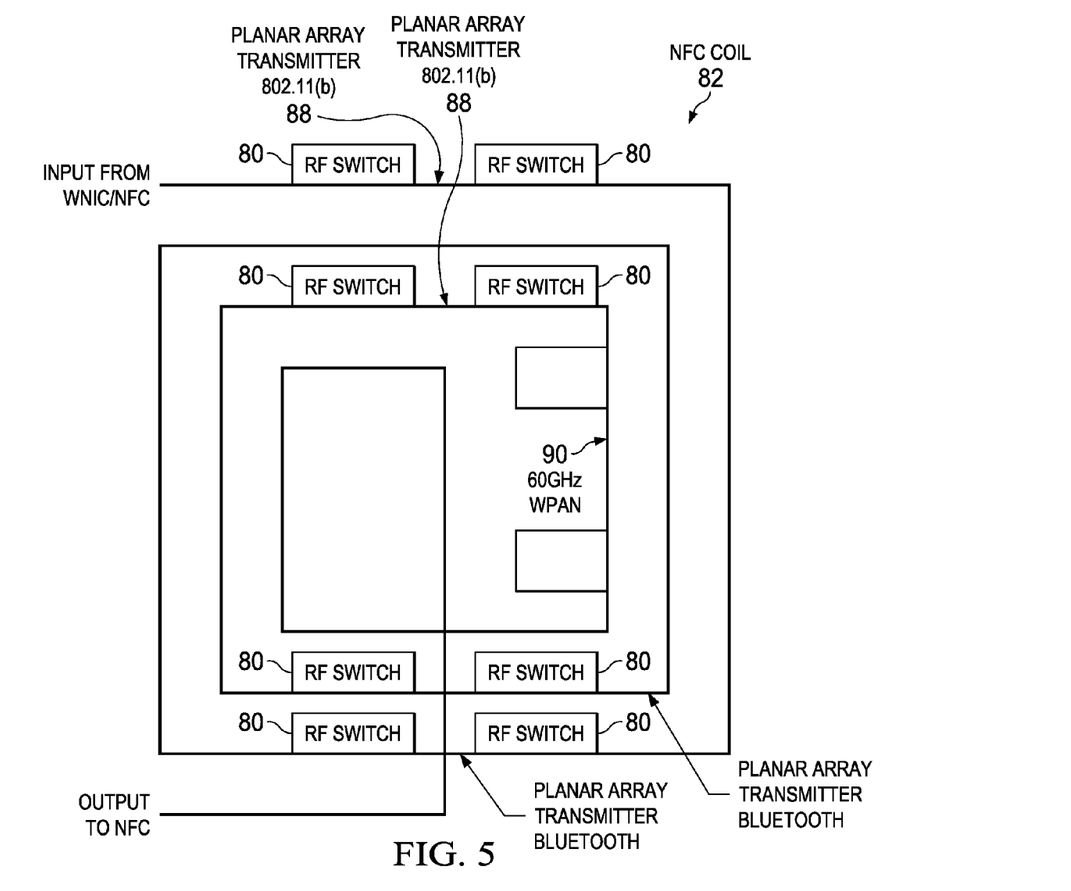
FIG. 5 depicts an example embodiment of an NFC antenna structure configured to support multiple wireless frequency bands for WLAN and WPAN communications.

Referring now to FIG. 5, an example embodiment depicts an NFC antenna structure configured to support multiple wireless frequency bands for WLAN and WPAN communications. A plurality of RF switches 80 are disposed at different points of NFC coil 82 to selectively open and close for isolating portions of conductive wire of NFC coil 82 to establish plural RF transmitter portions for communicating beyond near field effects. For example, a set of four RF switches 80 open to provide two parallel isolated conductive portions that define a planar array transmitter 88. In the center of NFC coil 82 a pair of RF switches 90 isolate a shorter portion of conductive material to support a 60 GHz WPAN antenna. Another set of RF switches defines a planar array antenna 92 for Bluetooth communications. Frequency bands for supporting communication at different protocols may be tuned based upon the length of conductive portions that are isolated and tuned by appropriate matching circuits. The RF switches may provide access at one end of each isolated conductor for a transceiver interface. In one embodiment, the planar array of plural isolated conductive portions may form a phased array antenna structure that directs RF signals along the same orientation that the end user has for interfacing with NFC. In this way, the transmitter may use a lower power setting with the directed RF signals so that reduced emissions are present to cause interference or that are available for snooping by unauthorized users.

Although the present invention has been described in detail, it should be understood that various changes, substitutions and alterations can be made hereto without departing from the spirit and scope of the invention as defined by the appended claims.

What is claimed is:

1. A server information handling system comprising:
   a chassis;
   a processor disposed in the chassis and operable to execute instructions that process information;
   memory disposed in the chassis and interfaced with the processor, the memory operable to store the instructions and information;
   a management controller disposed in the chassis and operable to manage operation of the processor;
   a wireless communication module disposed in the chassis and interfaced with the management controller, the wireless communication module operable to communicate wireless signals directly with an external information handling system through wireless medium having a wireless protocol; and
   a security module disposed in the management controller and operable to encrypt information sent by the wireless signals using a key, the security module sending the key to the external information handling system through a second medium different from the first medium;
   a near field communication (NFC) module disposed in the chassis and interfaced with the management controller, the NFC module operable to communicate with NFC signals to the external information handling system;
   an antenna structure disposed in the chassis and having a conductive wire disposed in a coil to support NFC communications; and
   an antenna controller interfaced with the antenna structure and the security module, the antenna controller operable to selectively configure the antenna structure to support NFC communications and to have an isolated portion to support the wireless medium communications using the wireless protocol;
   wherein the security module sends the key to the external information handling system through NFC communications; and
   wherein the security module disables configuration to support wireless medium communications except to external information handling systems that receive the key by NFC communications.

2. The server information handling system of claim 1 further comprising:
   an optical device operable to present the key with illumination; and
   an optical sensor disposed in the external information handling system and operable to detect the illumination to determine the key.

3. The system of claim 2 wherein the illumination comprises ultraviolet light.

4. The system of claim 2 wherein the illumination comprises infrared light.

5. The system of claim 2 wherein the illumination comprises plural individual diagnostic LEDs.

6. The system of claim 2 wherein the illumination comprises a control panel display that presents a textual code.

7. The system of claim 2 wherein the illumination comprises a bar code read by a camera of the external information handling system.

8. The system of claim 1 wherein the wireless medium comprises substantially 2.45 GHz radio signals.

9. A method for secure wireless communication of server management information from a portable information handling system to a server information handling system management controller, the method comprising:
   configuring an antenna structure coupled to the management controller to communicate by a first wireless communication medium;
   sending a key from the management controller to the portable information handling system by the first wireless communication medium, the first wireless communication medium made directly between the server information handling system and the portable information handling system;
   applying the key at the management controller and portable information to encrypt information;
   re-configuring the antenna structure to communicate by the second wireless communication medium in response to communication of the key by the first wireless communication medium; and
   in response to sending the key, sending the encrypted server management information by a second wireless communication medium, the second wireless communication medium made directly between the server information handling system and the portable information handling system;
   wherein configuring an antenna structure coupled to the management controller to communicate by the first wireless communication medium further comprises configuring a coil of conductive material to carry a current that generates a near field communication (NFC) signal with the key; and
   wherein re-configuring the antenna structure to communicate by the second wireless communication medium in response to communication of the key by the first wireless communication medium further comprises isolating at least a portion of the coil to define a wireless personal area network (WPAN) antenna that generates WPAN signal with the management information.

10. The method of claim 9 wherein the at least a portion of the coil defines a 60 GHz antenna to generate a 60 GHz signal.

11. The method of claim 9 wherein the first wireless medium comprises an optical signal presented by an optical illuminator interfaced with the management controller, the optical signal detected by an optical sensor of the portable information handling system.

12. The method of claim 11 wherein the optical signal comprises a flashing optical frequency of greater than that distinguishable by the human eye.

13. The method of claim 11 wherein the optical signal comprises a bar code presented at a diagnostics display proximate the management controller.

14. A server baseboard management controller (BMC) comprising:
   a management controller operable to manage operation of a server information handling system;
   a security module operable to generate keys for encrypting wireless communications associated with the management controller;

a wireless communication module interfaced with the security module and operable to communicate by first and second wireless signals;

an antenna structure having a conductive coil formed in a loop to generate NFC signals as the first wireless signal; and an antenna controller operable to selectively isolate a portion of the conductive coil to form a WPAN antenna, the antenna controller precluding configuration of the conductive wire into the WPAN antenna unless a key is provided by an NFC communication within a predetermined time of a WPAN communication;

wherein the security module coordinates communication with an external information handling system by sending a key through the first wireless signal directly to the external information handling system and communicating management information encrypted with the key through the second wireless signal directly to the external information handling system.

15. The server BMC of claim 14 wherein each of plural sets of management information sent through the second wireless signal is encrypted by a different randomly-generated key sent through the first wireless signal.

* * * * *